US011237694B2

(12) United States Patent
Abadzhimarinov et al.

(10) Patent No.: US 11,237,694 B2
(45) Date of Patent: Feb. 1, 2022

(54) SYNCHRONIZED MULTIPLE POP-UP WINDOWS IN A VIRTUALIZED COMPUTING ENVIRONMENT

(71) Applicant: VMware, Inc., Palo Alto, CA (US)

(72) Inventors: Branislav Abadzhimarinov, Sofia (BG); Martin Marinov, Sofia (BG); Plamen Semerdzhiev, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 126 days.

(21) Appl. No.: 16/447,983

(22) Filed: Jun. 21, 2019

(65) Prior Publication Data

US 2020/0401296 A1    Dec. 24, 2020

(51) Int. Cl.
| | |
|---|---|
| *G06F 3/048* | (2013.01) |
| *G06F 3/0481* | (2013.01) |
| *G06F 9/455* | (2018.01) |
| *G09G 5/12* | (2006.01) |
| *G06F 3/0484* | (2013.01) |
| *G06F 3/0488* | (2013.01) |

(52) U.S. Cl.
CPC ...... *G06F 3/04812* (2013.01); *G06F 3/04842* (2013.01); *G06F 3/04886* (2013.01); *G06F 9/45558* (2013.01); *G09G 5/12* (2013.01)

(58) Field of Classification Search
CPC ............ G06F 3/04812; G06F 3/04842; G06F 3/04886; G06F 9/45558; G06F 3/048; G09G 5/12
See application file for complete search history.

(56) References Cited

U.S. PATENT DOCUMENTS

| | | | | |
|---|---|---|---|---|
| 9,472,002 | B1* | 10/2016 | Wong | G06F 11/3409 |
| 2011/0125832 | A1* | 5/2011 | Dahl | G06F 11/3419 |
| | | | | 709/203 |
| 2014/0022256 | A1* | 1/2014 | Carnes | A61B 5/14553 |
| | | | | 345/440.1 |
| 2014/0075380 | A1* | 3/2014 | Milirud | G06F 11/323 |
| | | | | 715/810 |
| 2014/0280052 | A1* | 9/2014 | Alonso | G06Q 30/0201 |
| | | | | 707/722 |
| 2016/0171730 | A1* | 6/2016 | Aoki | H04B 10/07 |
| | | | | 345/419 |

\* cited by examiner

*Primary Examiner* — Jeanette J Parker
(74) *Attorney, Agent, or Firm* — Su IP Consulting

(57) ABSTRACT

Example methods are provided to provide synchronization between multiple pop-up windows that are displayed by a user interface. The pop-up windows may render graphical representations of usage data provided through operational metrics associated with elements in a virtualized computing environment. User navigation to a navigation point in one pop-up window results in a similar navigation to another navigation point in another pop-up window, such that information in for the navigation points in both pop-up windows may be presented in accordance with a common timestamp.

21 Claims, 5 Drawing Sheets

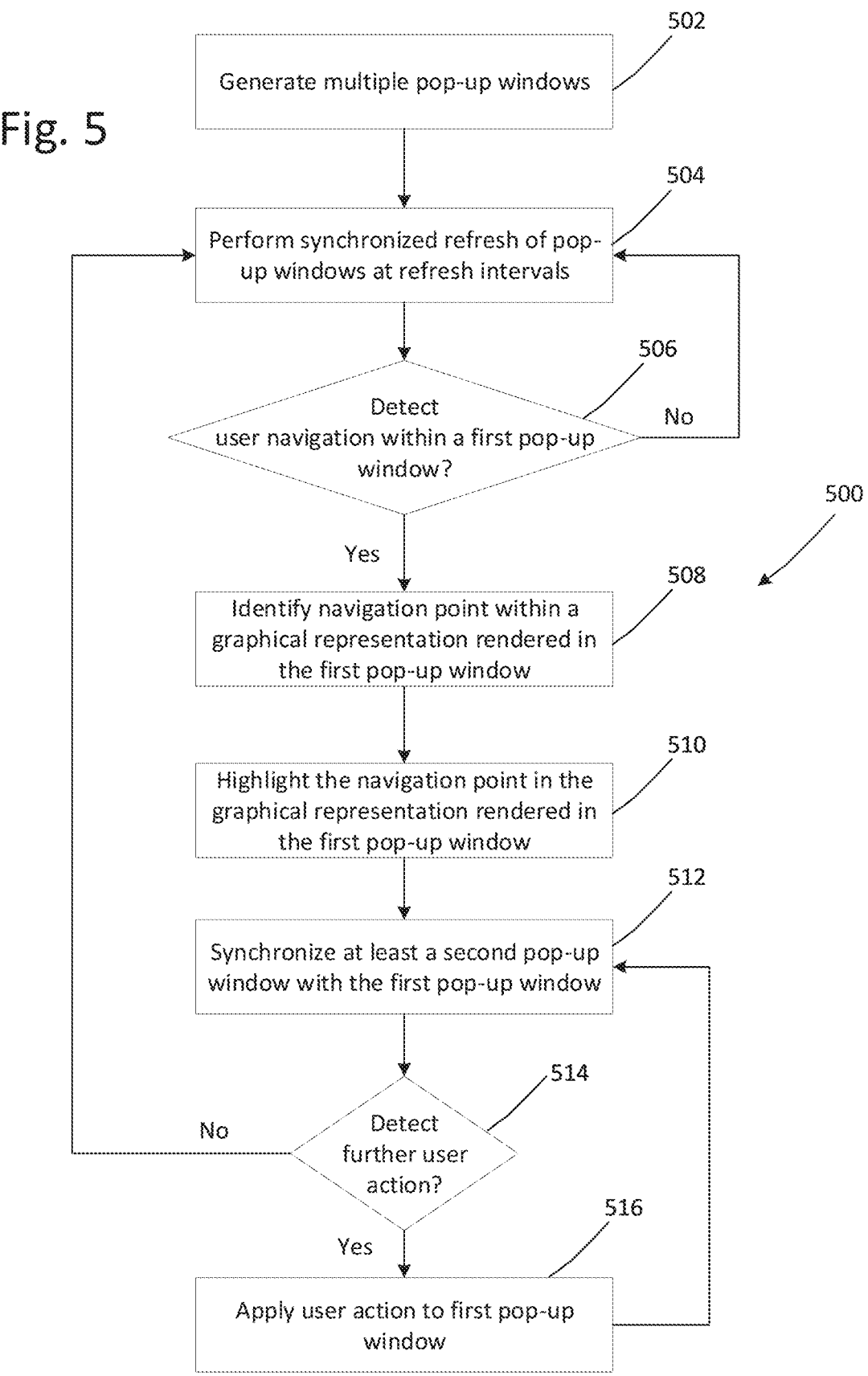

SYNCHRONIZED MULTIPLE POP-UP WINDOWS IN A VIRTUALIZED COMPUTING ENVIRONMENT

BACKGROUND

Unless otherwise indicated herein, the approaches described in this section are not admitted to be prior art by inclusion in this section.

In a computing environment, users such as system administrators may monitor the status of various computing elements in the computing environment. For example, the system administrator may examine various metrics such as power consumption, central processing unit (CPU) usage, latency, etc. of computing elements, for purposes of ascertaining the real-time health or other operational status of the computing elements. In other situations, the system administrator may examine the values of these metrics that manifest over a period of time, for purposes of diagnosis, troubleshooting, or other compiling and analysis of historical behavior.

The values of these metrics are often presented to the system administrator as usage data depicted via graphical representations on a user interface. However, user interfaces often fail or are otherwise inadequate in presenting the graphical representations in an easy-to-understand manner.

SUMMARY

According to one aspect, a method is provided to synchronize pop-up windows of a user interface for a virtualized computing environment. The method includes: generating multiple pop-up windows on the user interface, wherein the multiple pop-up windows include a first pop-up window and at least a second pop-up window; rendering a first graphical representation in the first pop-up window and a second graphical representation in the at least the second pop-up window, wherein the first and second graphical representations are associated with usage data that pertain to operation of elements in the virtualized computing environment; detecting a navigation to a first navigation point in the first graphical representation; highlighting the first navigation point; and synchronizing the at least the second pop-up window with the first pop-up window by highlighting a second navigation point, in the second graphical representation, that corresponds to a same timestamp as the first navigation point.

According to another aspect, a non-transitory computer-readable medium is provided that has instructions stored thereon, which in response to execution by one or more processors, cause the one or more processors to perform or control performance of operations to synchronize pop-up windows of a user interface for a virtualized computing environment. The operations include: generating multiple pop-up windows on the user interface, wherein the multiple pop-up windows include a first pop-up window and at least a second pop-up window; rendering a first graphical representation in the first pop-up window and a second graphical representation in the at least the second pop-up window, wherein the first and second graphical representations are associated with usage data that pertain to operation of elements in the virtualized computing environment; detecting a navigation to a first navigation point in the first graphical representation; highlighting the first navigation point; and synchronizing the at least the second pop-up window with the first pop-up window by highlighting a second navigation point, in the second graphical representation, that corresponds to a same timestamp as the first navigation point.

According to still another aspect, an apparatus is provided to synchronize pop-up windows for a virtualized computing environment. The apparatus includes: a display screen configured to present a user interface; a pop-up window generator configured to generate multiple pop-up windows on the user interface, wherein the multiple pop-up windows include a first pop-up window and at least a second pop-up window, wherein the user interface is configured to render a first graphical representation in the first pop-up window and a second graphical representation in the at least the second pop-up window, and wherein the first and second graphical representations are associated with usage data that pertain to operation of elements in the virtualized computing environment; a navigation detection component configured to detect a navigation to a first navigation point in the first graphical representation, wherein the user interface is further configured to highlight the first navigation point; and a synchronization component configured to synchronize the at least the second pop-up window with the first pop-up window by causing the user interface to highlight a second navigation point, in the second graphical representation, that corresponds to a same timestamp as the first navigation point.

BRIEF DESCRIPTION OF DRAWINGS

FIG. 5 is a flowchart of an example method to present synchronized multiple pop-up windows in the virtualized computing environment in FIG. 1.

DETAILED DESCRIPTION

Figure 1:
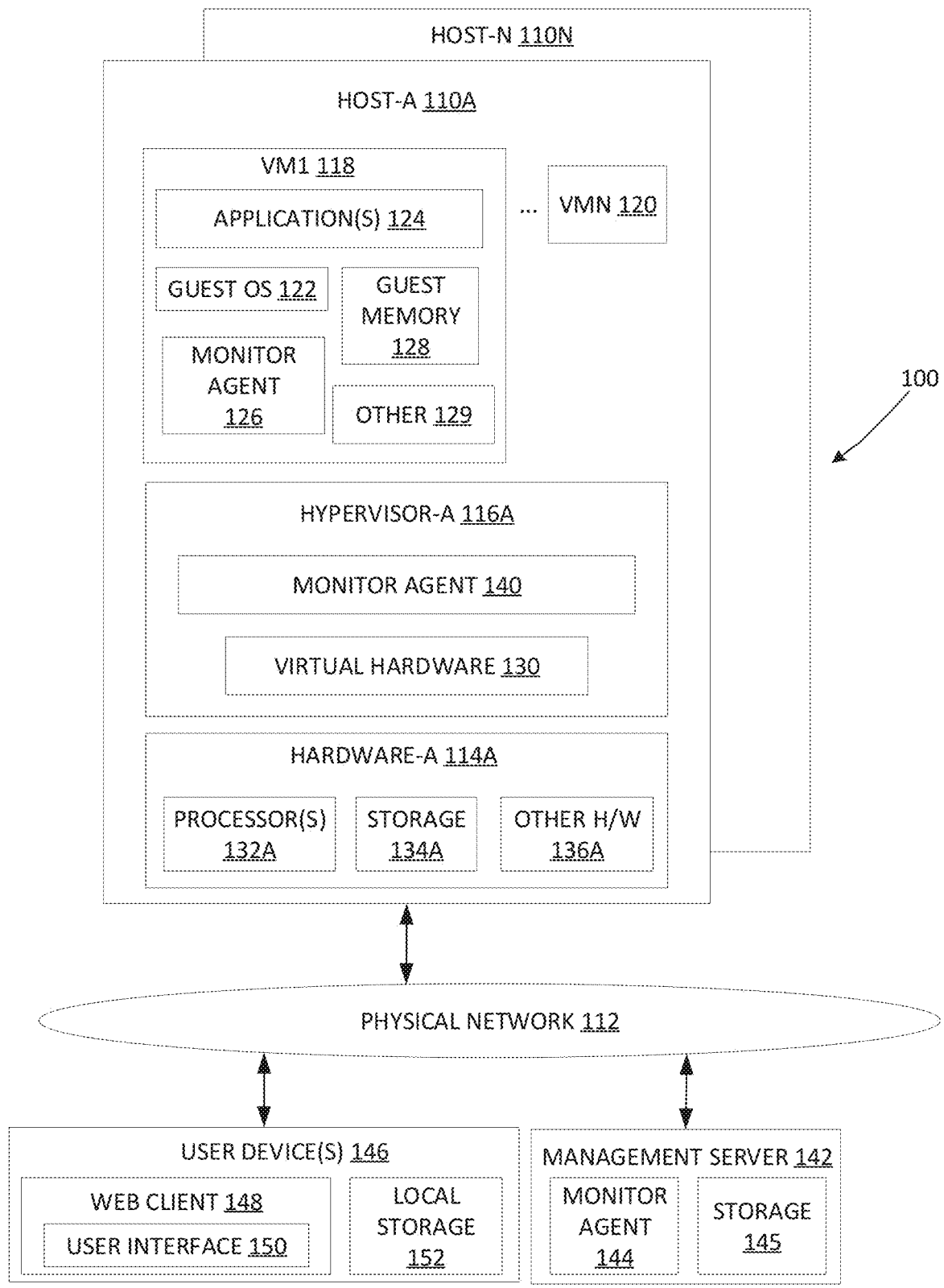
FIG. 1 is a schematic diagram illustrating an example virtualized computing environment in which synchronized multiple pop-up windows can be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses the above-described drawbacks, by providing a user interface that presents multiple pop-up windows. The presentation of content in the pop-up windows can be synchronized with each other in a several ways. For example, if a user actuates a navigation tool to navigate a marker (e.g., a cursor or cross-hair) to a particular timestamp on a graphical representation in a first pop-up window, navigation to the same timestamp can also be provided in a graphical representation in a second pop-up window.

Computing Environment

The technology described herein may be implemented in a virtualized computing environment in some embodiments. Virtualization allows the abstraction and pooling of hardware resources to support virtual machines in a virtualized computing environment, such as a software-defined datacenter (SDDC). For example, through server virtualization, virtual machines running different operating systems may be supported by the same physical machine (e.g., referred to as a "host"). Each virtual machine may be generally provisioned with virtual resources to run an operating system and applications. The virtual resources may include central processing unit (CPU) resources, memory resources, storage resources, network resources, etc.

Various implementations will now be explained in more detail using FIG. 1, which is a schematic diagram illustrating an example virtualized computing environment 100 in which synchronized multiple pop-up windows can be implemented. Depending on the desired implementation, virtualized computing environment 100 may include additional and/or alternative components than that shown in FIG. 1.

In the example in FIG. 1, the virtualized computing environment 100 includes multiple hosts, such as host-A 110A . . . host-N 110N that may be inter-connected via a physical network 112. Examples of the physical network 112 can include a wired network, a wireless network, the Internet, or other network types and also combinations of different networks and network types. For simplicity of explanation, the various components and features of the hosts will be described hereinafter in the context of host-A 110A. Each of the other host-N 110N can include substantially similar components and features.

The host-A 110A includes suitable hardware 114A and virtualization software (e.g., hypervisor-A 116A) to support various virtual machines (VMs). For example, the host-A 110A supports VM1 118 . . . VMN 120. In practice, the virtualized computing environment 100 may include any number of hosts (also known as a "computing devices", "host computers", "host devices", "physical servers", "server systems", "physical machines," etc.), wherein each host may be supporting tens or hundreds of virtual machines. For the sake of simplicity, the details of only the single VM1 118 is shown and described herein.

VM1 118 may include a guest operating system (OS) 122 and one or more guest applications 124 (and their corresponding processes) that run on top of the guest operating system 122. VM1 118 may also include a monitor agent 126. The monitor agent 126 of various embodiments may be in the form of a daemon or other software/code that runs in a background process to obtain/generate operational metrics associated with the operation of VM1 118, such as CPU usage, power consumption, latency, and other usage information. In some embodiments, the monitor(s) described herein may be in the form of a performance counter, a timer, etc. Further details of the features and use of the monitor agent 126 and the metrics (and how usage data related to these metrics may be presented in a user interface) will be described later below with respect to FIGS. 2-5.

VM1 118 may also include a guest memory 128 for guest operating system 122 and/or for other storage purposes. VM1 118 may include still further other elements, generally depicted at 129, such as a virtual disk and/or other elements usable in connection with operating VM1 118.

The hypervisor-A 116A may be a software layer or component that supports the execution of multiple virtualized computing instances. The hypervisor-A 116A may run on top of a host operating system (not shown) of the host-A 110A or may run directly on hardware 114A. The hypervisor-A 116A maintains a mapping between underlying hardware 114A and virtual resources (depicted as virtual hardware 130) allocated to VM1 118 and the other VMs.

In one embodiment, the hypervisor-A 116A may include or otherwise operate a monitor agent 140. The monitor agent 140 may be provided as an addition to or as an alternative of the monitor agent 126 in VM1 118. The monitor agent 140 may be configured to obtain/generate performance metrics associated with the operation of VM1 118 and/or any other VMs, with the operation of the host-A 110, and/or with the operation of any other element in the virtualized computing environment 100. Such metrics may include CPU usage, power consumption, latency, etc., and the usage data associated with these metrics may be presented in a user interface in a manner that will be described later below with respect to FIGS. 2-5.

Hardware 114A in turn includes suitable physical components, such as CPU(s) or processor(s) 132A; storage device(s) 134A; and other hardware 136A such as physical network interface controllers (NICs), storage disk(s) accessible via storage controller(s), etc. Virtual resources (e.g., the virtual hardware 130) are allocated to each virtual machine to support a guest operating system (OS) and application(s) in the virtual machine, such as the guest OS 122 and the applications 124 (e.g., Microsoft Word, Microsoft Excel, etc.) in VM1 118. Corresponding to the hardware 114A, the virtual hardware 130 may include a virtual CPU, a virtual memory, a virtual disk, a virtual network interface controller (VNIC), etc.

A management server 142 of one embodiment can take the form of a physical computer with functionality to manage or otherwise control the operation of host-A 110A . . . host-N 110N. For example, the management server 142 may be operable to collect usage data from the monitor agents 126 and 140, to configure VMs, to activate or shut down VMs, and to perform other managerial tasks. The management server 142 may be a physical computer that provides a management console and other tools that are directly or remotely accessible to a system administrator so as to monitor or otherwise evaluate the performance of VMs and hosts.

In one embodiment, the management server 142 may itself include a monitor agent 144, which may be provided as an addition to or as an alternative of the monitor agent 126 in VM1 118 and the monitor agent 140 in hypervisor-A 116A. Like these other monitor agents 126 and 140, the monitor agent 144 may be configured to obtain/generate performance metrics associated with the operation of VM1 118 and/or any other VMs, with the operation of the host-A 110, and/or with the operation of any other element in the virtualized computing environment 100. Similarly, such metrics may include CPU usage, power consumption, latency, etc., and the usage data associated with these metrics may be presented in a user interface in a manner that will be described later below with respect to FIGS. 2-5. The management server 142 may also include a storage device 145 to store the usage data that is obtained/generated by the monitor agent(s). The storage device 145 may reside in the management server 142 and/or may be located externally to the management server 142.

The usage data stored in the storage device 145 may be provided to requesting devices and entities. For example, the management server 142 may push the usage data to a computing device of a system administrator for rendering as graphical representations to be reviewed by the system administrator via a user interface. Alternatively or additionally, the usage data may be pulled by the computing device of the system administrator for rendering as the graphical representations.

The management server 142 may be communicatively coupled to host-A 110A . . . host-N 110N (and hence communicatively coupled to the virtual machines, hypervisors, monitor agents, hardware, etc.) via the physical network 112. The host-A 110A . . . host-N 110N may in turn be configured as a datacenter that is also managed by the management server 142. In some embodiments, the functionality of the management server 142 may be implemented in any of host-A 110A . . . host-N 110N, instead of being provided as a separate standalone device such as depicted in FIG. 1.

A user may operate a user device 146 to access, via the physical network 112, the functionality of VM1 118 . . . VMN 120, using a web client 148. In one embodiment, the user may be a system administrator that also uses the web client 148 of the user device 146 to remotely communicate with the management server 142 for purposes of configuring and managing the VMs and hosts, and also for purposes of reviewing usage data from the metrics provided by the monitor agents 126, 140, and 144. For example, the web client 148 may pull the usage data from the storage device 145 of the management server 142 (or, the management server 142 may push the usage data to the web client 148), and the web client 148 can then present the usage data as graphical representations rendered on a user interface 150. The user interface 150 may comprise part of the web client 148, or may be external to the web client 148 but controllable by the web client 148. Web client 148 of one embodiment may in turn be any suitable browser-based application that is capable to obtain usage data from a server (or other remote source), to generate graphical representations of the usage data on the user interface 150 (including controlling the user interface 150 to display the usage data on pop-up windows), to update the data contained in the graphical representations, to synchronize the data displayed in the pop-up windows with each other, and to detect and respond to user interaction with the displayed data. These features will be described in more detail with respect to FIGS. 2-5.

The user device 146 may further include a local storage device 152. The local storage device 152 may be operable to store usage data that is pushed by or pulled from the management server 142, so that such usage data can be stored locally at the user device 146 for rendering in the user interface 150 until such time that the usage data becomes stale and is refreshed by updated data. Still further, the storage device 152 may be a non-transitory computer-readable medium (such as a memory) configured to store software or other computer-readable instruction, which in response to execution by a processor, cause the processor to perform or control performance of the operations described herein to present usage data in graphical representations rendered in pop-up windows and to provide synchronization between the pop-up windows.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Figure 2:
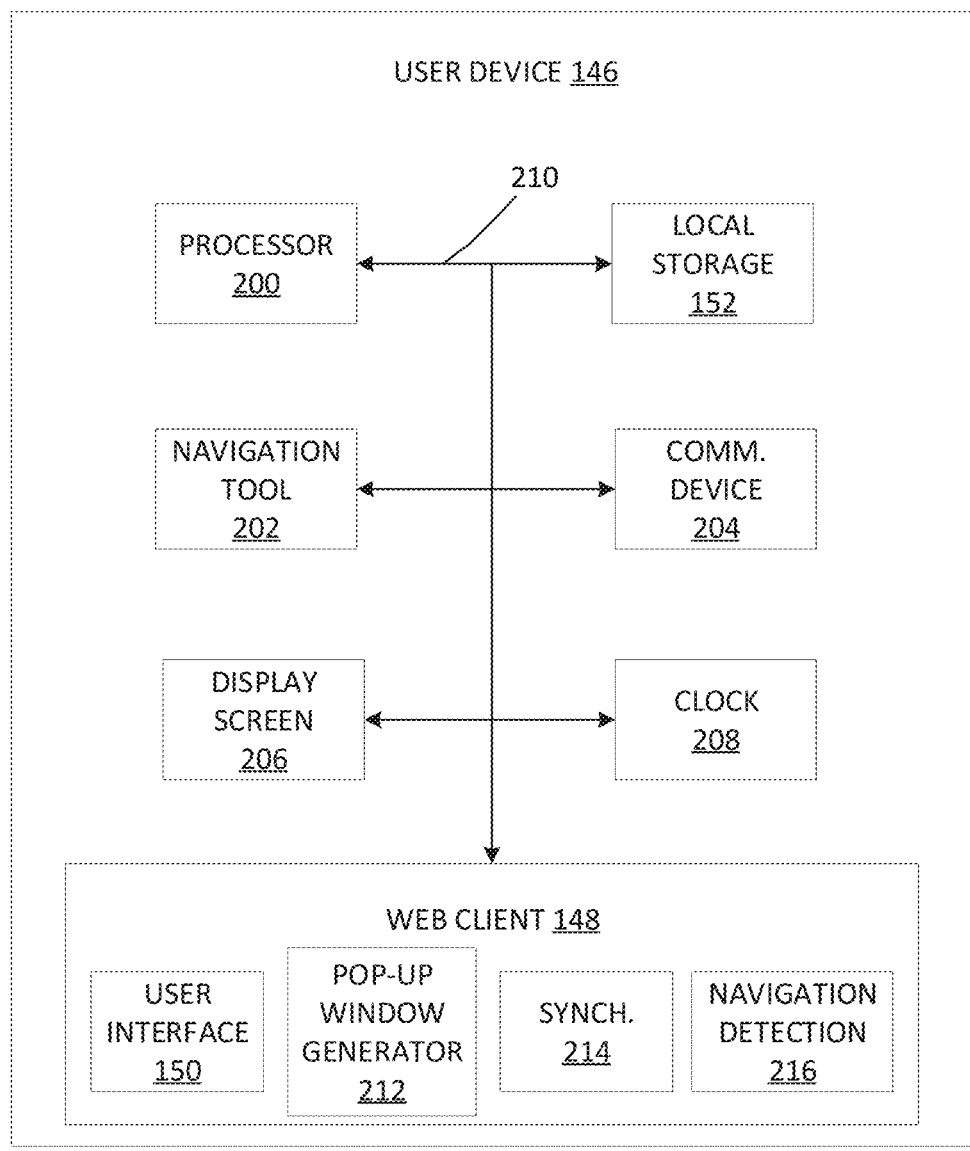
FIG. 2 is a block diagram of an example user device of the virtualized computing environment of FIG. 1 that can present synchronized multiple pop-up windows.

FIG. 2 is a block diagram showing one embodiment of the user device 146 of the virtualized computing environment of FIG. 1 in more detail. Specifically, FIG. 2 shows various elements of the user device 146 that can cooperate with each other to present usage data in pop-up windows on the user interface 150, with the presentation being performed in a synchronized manner. The user device 146 can be in the form of a computer, including desktop computers and portable computers (such as laptops and smart phones).

The user device 146 can include a processor 200, the local storage device 152, a navigation tool 202, a communication device 204, a display screen 206, the web client 148 and user interface 150, and a clock 208. All of these elements can be physically coupled (such as by a bus) and/or logically coupled together, as represented at 210, for operation and communication with each other. For the sake of brevity, other elements of the user device 146 are not shown and described in further detail herein.

The processor 200 can be any suitable CPU or controller that is operable to manage and control the operation of the various elements of the user device 146, including as explained above, execution of computer-readable instructions stored on the local storage device 152. The navigation tool 202 can be in the form of a mouse, keyboard, touch screen, or other device that may be actuated by the user to navigate through the user interface 150 and that can cause depiction of the user's navigation as a cursor, cross-hairs, highlighting, click and drag, or other marker on the user interface 150. The communication device 204 can be in the form of a network controller/adapter or any other device(s) that are operable to establish a wireless or wired communication link with the management server 142 and with any other element in the virtualized computing environment 100. The communication device 204 may be used, for example, to obtain usage data from the management server 142.

The user device 146 may further include a display screen 206 that may cooperate with the web client 148 to present the user interface 150 (including graphical representations of usage data rendered in pop-up windows) to the user. The user device 146 may also include a clock 208 (such as a system clock) to serve as a reference timestamp to synchronize the refresh intervals of the usage data shown in the pop-up windows rendered by the user interface 150. With respect to the web client 148, the web client 148 may reside in the local storage device 152 as a computer program executable by the processor 200, and can include or otherwise work in conjunction with the user interface 150, a pop-up window generator 212, a synchronization component 214, and a navigation detection component 216. One or more of the user interface 150, the pop-up window generator 212, the synchronization component 214, and the navigation detection component 216 can be embodied as computer code, subroutines, function calls, or other computer-executable instructions.

Synchronization Between Pop-Up Windows

In one embodiment, the pop-up window generator 212 causes the user interface 150 to render one or more pop-up windows that present usage data. The pop-up window generator 212 may render the pop-up windows in response to the navigation detection component 216 having detected that the user has operated the navigation tool 202 to select some metric to render in a pop-up window.

The navigation detection component 216 may also detect other user operation of the navigation tool 202. For example in one embodiment that will be shown and described later below, the user may use the navigation tool 202 to move a cursor (or cross-hairs) to a particular navigation point (e.g., corresponding to a particular timestamp) on a graphical representation—the navigation detection 216 detects this movement of the navigation tool 202 and instructs the pop-up generator to highlight or otherwise present further details regarding the particular navigation point.

In one embodiment, each pop-up window "listens" to the activity that is occurring at another pop-up window. In the above example, if the user has navigated to the particular navigation point at the particular timestamp in a first pop-up window, a second (or more) pop-up window(s) may detect that the first pop-up window has responded to this navigation and thus the other pop-up window(s) will correspondingly highlight or otherwise present their respective further usage data for the same particular timestamp. The synchronization component 214 of one embodiment may be a piece of code that instructs each of such other pop-up windows to monitor the activity that occurs at the other pop-up window(s), and then instructs the such other pop-up windows to similarly present detailed information at the same particular timestamp, such that each pop-up window are synchronized in their presentation/highlighting at the same particular timestamp.

In still other embodiments, the synchronization component 214 can control other types of synchronization actions. For example, the synchronization component 214 can control the refresh interval of each pop-up window, such that their respective displayed content are refreshed at the same time. For example, a first pop-up window may be rendered at time 10:00:00 and then refreshed at 20 second intervals (e.g., at times 10:00:20, 10:00:40, 10:01:00, etc. as measured from the clock 208). The synchronization component 214 can trigger any other rendered pop-up window to also refresh at the same time intervals (e.g., also at times 10:00:20, 10:00:40, 10:01:00, etc. as measured from the clock 208). In this manner, the usage data presented to the user in multiple pop-up windows are correspondingly "fresh" with respect to each other (e.g., one pop-up window does not render "stale" usage data relative to another pop-up window).

In other embodiments, the synchronization component 214 can control still further synchronization actions. For example, a zoom-in or zoom-out on one pop-up window can result in a corresponding zoom-in or zoom-out in another pop-up window. Still as another example, changing the type of view in one pop-up windown (such as changing from viewing host data to viewing VM data) results in a similar corresponding change of the view in other pop-up windows.

Figure 3:
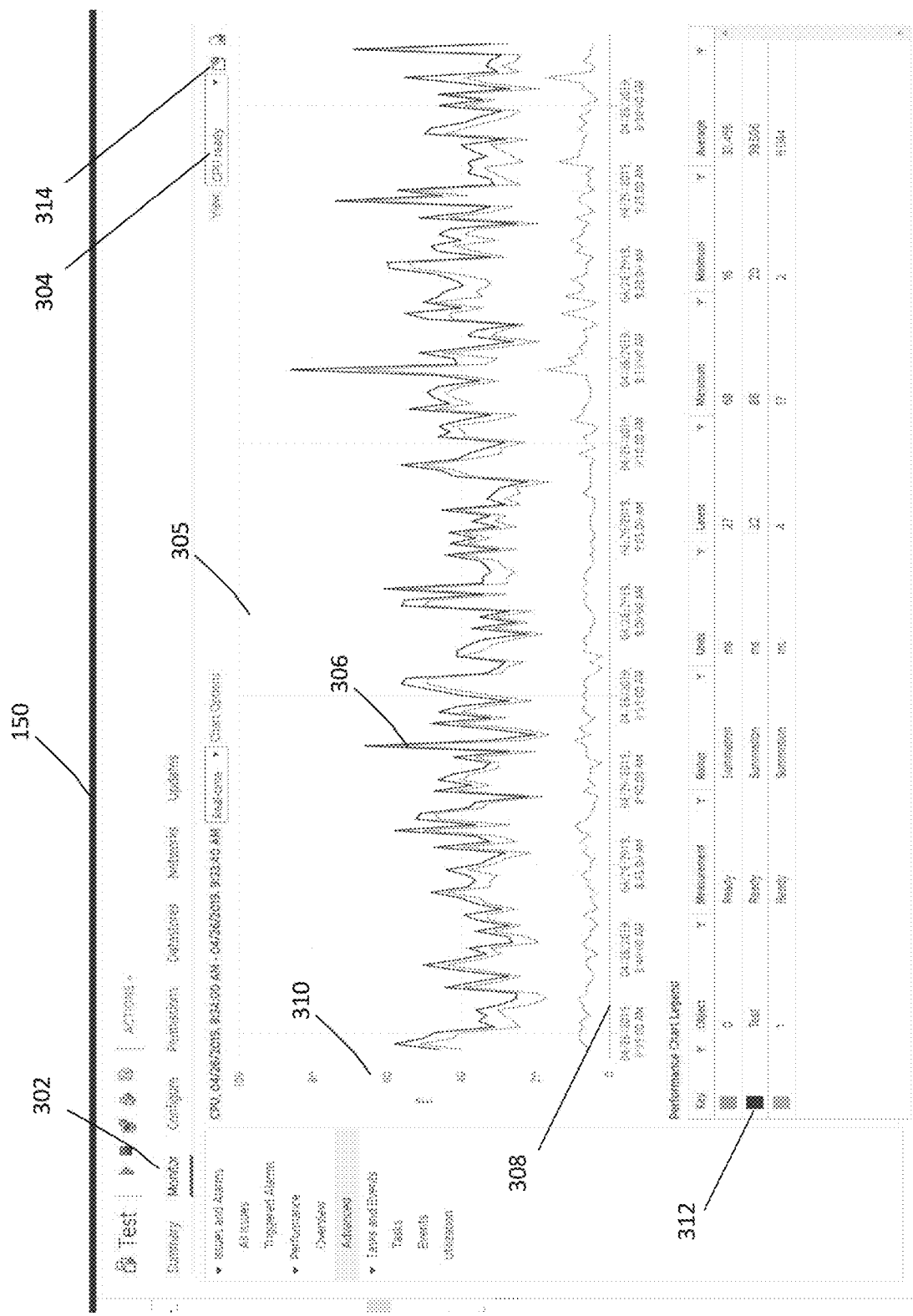
FIG. 3 is a screen shot of an example user interface that can be provided by the user device of FIG. 2.

FIG. 3 is a screen shot of an example of the user interface 150 that can be provided by the user device 146 of FIG. 2. In the example of FIG. 2, there is a single window rendered in the user interface 150, without any additional pop-up windows. Alternatively, the window shown FIG. 2 can be itself considered to be a "single" pop-up window. The window in the user interface 150 of FIG. 3 is set for viewing by the system administrator in the "monitor" mode, by way of selection of a "Monitor" tab 302.

In the monitor mode, the user interface 150 presents usage data that is pushed by or pulled from the management server 142, and which may be stored in the local storage device 152. The usage data may provided by metrics monitored by one or more of the monitoring agents 126, 140, or 144 shown in FIG. 1. The usage data may in turn be associated with operational performance of one or more VMs, hosts, or other element in the virtualized computing environment 100.

In the example of FIG. 3, the metric that is being monitored is "CPU Ready", which may be a measure of an amount of time that a particular VM was ready but could not get scheduled to run on a physical CPU. A pull-down menu 304 is usable to make the "CPU Ready" metric as the current selection for presenting the usage data in the user interface 150. Other metrics may be selected from the pull-down menu 304 for display of their corresponding usage data in the user interface 150, such as CPU usage (in percentage), CPU usage (in MHz), network latency, data store read/write latency, memory usage (in KBs), network transmission rate (in KBps), power consumption, virtual disk usage, storage adapter read/write latency, as a few examples. Additional or alternative metrics may be selected from the pull-down menu 304 dependent on the particular application and elements that are present in the virtualized computing environment 100. Furthermore, one or more of the metrics can be applicable to single VMs, multiple VMS (such as a cluster of VMs), hosts, groups of hosts in a datacenter, and/or to other elements in the virtualized computing environment, dependent on the type of metric being measured.

The usage data of the particular metric (in this example the CPU Ready metric) may be presented in a display window 305 as one or more graphical representations 306, such as a line graph or line chart. The graphical representation 306 may have a horizontal axis 308 that represents time (e.g., segmentations of timestamps in terms of month/day/year and hour/minute/second AM or PM). The graphical representation 306 may have a vertical axis 310 that represents a value of CPU Ready (in ms) in this example, at each timestamp.

Another graphical representation 312 may be in the form of a table that presents some other values, such as latest, minimum, maximum, and average CPU Ready times. Furthermore, the graphical representation 312 may display such values for each of a plurality of VMs or other objects (such as hosts or other elements in the virtualized computing environment 100). Each object may in turn also have a corresponding line graph/chart as their graphical representation 306 (such as via different colors or line styles), such that the display window 305 presents multiple graphical representations 306 that correspond to each VM. In this manner, the system administrator can view and compare the performance/usage of several VMs over a time period, concurrently or side-by-side, thereby avoiding having to render a separate window for each line graph, which in turn uses the real estate of the display screen 206 more efficiently and reduces the amount of potential clutter.

The user interface 150 may be provided with a pop-up window command button 314. If the pop-up window command button 314 is activated (such as by clicking with the navigation tool 202), the user interface 150 will launch a new pop-up window to present usage data that corresponds to the metric that is currently selected in the pull-down menu 304. The new pop-up window (if corresponding to a different metric than that presented in the current display window 305) will superimpose/overlay the currently displayed window (e.g., both windows will be concurrently displayed). In other embodiments, clicking on the pop-up window command button 314 closes out the currently displayed window in favor of presentation of the new pop-up window. Some examples will be described next with respect to FIG. 4.

Figure 4:
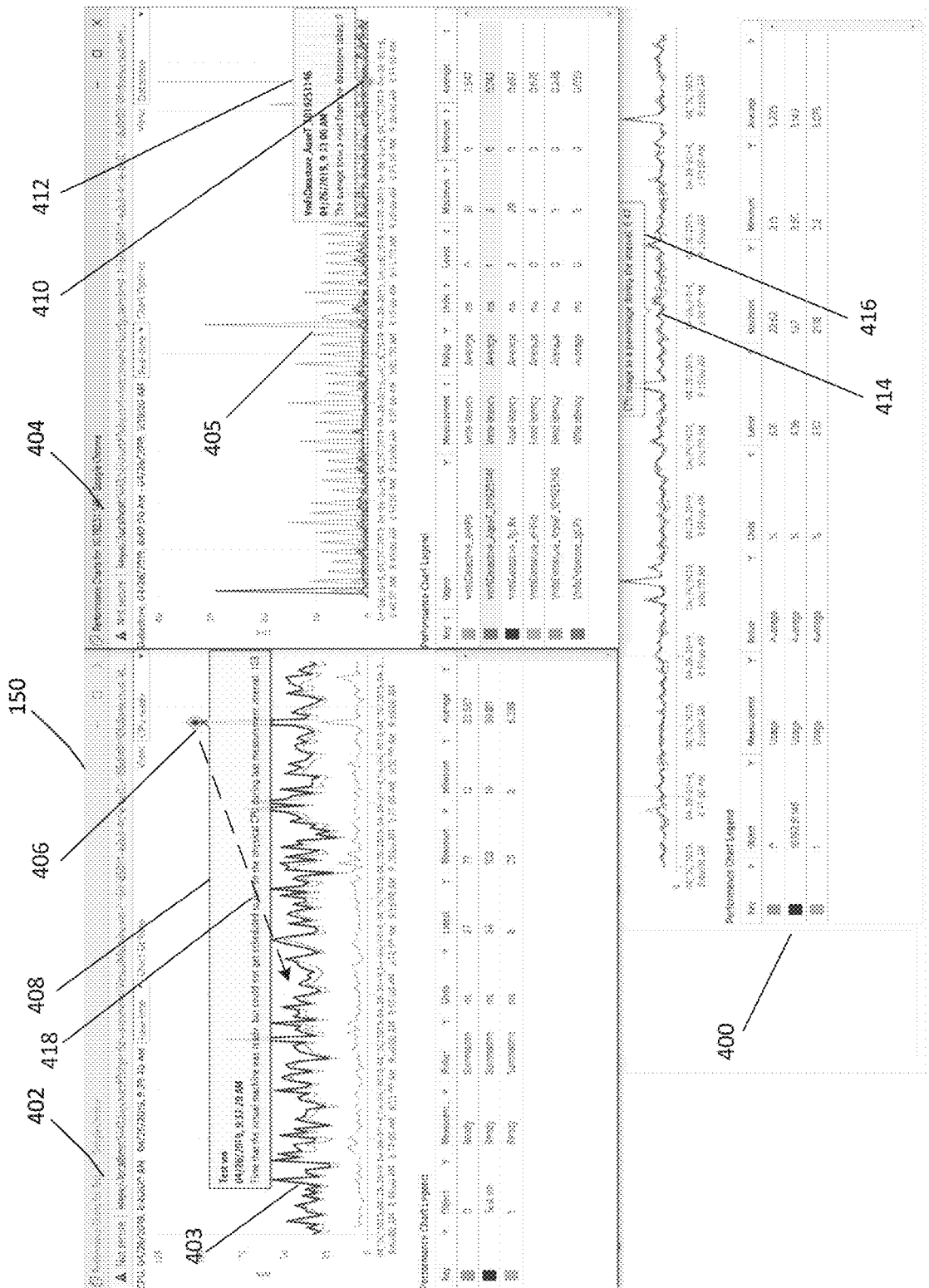
FIG. 4 a screen shot of an example user interface with multiple pop-up windows that can be provided by the user device of FIG. 2.

FIG. 4 is a screen shot showing an example of the user interface 150 rendering multiple pop-up windows. In the example of FIG. 4, a currently displayed window 400 is/was for the metric for CPU usage (in percentage), and then the system administrator has used the pull-down menu 304 and the pop-up window command button 314 (two activations each) to cause the user interface 150 to render a first pop-up window 402 and a second pop-up window 404. The first pop-up window 402 and the second pop-up window 404 are overlaid, in this example, over the window 400, such that the window 400 is not closed out.

The first pop-up window 402 displays a first graphical representation 403 of usage data for the metric "CPU Ready," while the second pop-up window 404 displays a second graphical representation 405 of usage data for the metric "Datastore" (for read/write latency of a data storage device). In the first pop-up window 402, the user has used the navigation tool 202 so as to place a cross-hair 406 at a particular navigation location (such as a peak point) on the line graph associated with a virtual machine "Test vm" (represented with a darker line graph relative to other VMs), at a particular timestamp location 04/26/2019, 9:33:20 AM. The user interface 150 correspondingly highlights or otherwise identifies that particular navigation point on the line graph, by rendering an infomation box 408 at that particular navigation point, with the content of the information box 408 identifying the particular VM, the timestamp value, and the value of the CPU Ready metric (103 ms) at that particular navigation point. In one embodiment, the web client 148 may obtain the values displayed in the information box 408 from the local storage device 152. In situations where such values are stale or unavailable from the local storage device 152, the web client 148 may pull the values from the storage device 145 of the management server 142.

In synchronized manner, the second pop-up window 404 may also provide a highlight, via a faded cross-hair 410 and an information box 412, at substantially the same timestamp location (e.g., at timestamp location 04/26/2019, 9:33:00 AM) on the graphical representation 405. The cross-hair 410 may be faded since it is not the primary cross-hair that is being actively controlled by the user with the navigation tool 202.

The faded cross-hair 410 is placed on the line graph of a data storage device called "VmfsDatastoreA-qaeT_1019251146" that is associated with the VM "Test vm", at a timestamp location 04/26/2019, 9:33:00 AM. The information box 412 at that timestamp location, for that particular data storage device, identifies the storage device, the timestamp value, and the value of the Datastore metric (around 0 ms for the average time to read from the data storage device).

In some embodiments, the timestamp values at the highlighted points that correspond to each other, between the first pop-up window 402 and the second pop-up window 404, may not necessarily have identical values. For instance for the example shown in FIG. 4, the timestamp value at the particular navigation point in the first pop-up window 402 is displayed as 9:33:20 AM, while the timestamp value in the corresponding navigation point in the second pop-up window 404 is displayed as 9:33:00 AM (e.g., a difference of 20 seconds). This difference in the displayed timestamp values can be due to a number of factors, including latency differences between pop-up windows in receiving or rendering the usage data, differences in x-axis or y-axis resolution between the graphical representation in one pop-up window versus the graphical representation in another pop-up window, acceptable tolerance/difference errors, etc.

It is also noted that in the example of FIG. 4, a corresponding faded cross-hair 414 and/or an information box 416 may also be provided, at substantially the same timestamp location, in the window 400 that displays usage data for the CPU Usage metric. For example the faded cross-hair 414 and/or the information box 416 may highlight a navigation point, at the same timestamp location, in a line graph of a CPU that is associated with the VM "Test vm."

As the user moves the cross-hair 406 within a particular pop-up window, or from one pop-up window to another, that navigation is also synchronized in the other windows. For instance in FIG. 4, the user may navigate the cross-hair 406 to the left (e.g., to an earlier timestamp) in the first pop-up window 402. This navigation is represented by the broken arrow line 418. With this navigation, the cross-hair 406 may land on some other (earlier) timestamp location on the same line graph of the VM "Test vm" or may land on an earlier timestamp location on a different line graph associated with some other VM, in the first pop-up window 402. A corresponding movement to the left (earlier timestamp) occurs in the second pop-up window 404 and the window 400, with highlighting (via faded cross-hairs and/or information boxes) being rendered as the cross-hair(s) move from one location to another. In this manner, the movement of the highlighting in the second pop-up window 404 tracks the movement of the highlighting (from one location to another) in the first pop-up window 402 as the user navigates within the first pop-up window 402. Further in one embodiment, user navigation (via the navigation tool 202) can be enabled in the second pop-up window 404, such that user navigation in the second pop-up window 404 results in a corresponding navigational movement in the first pop-up window 402 and/or in any other pop-up window rendered by the user interface 150.

FIG. 5 is a flowchart of an example method 500 to present synchronized multiple pop-up windows. The method 500 can be implemented in the virtualized computing environment 100 in one embodiment. In another embodiment, the method 500 can be implemented in some other type of computing environment (which may not necessarily involve a virtualized computing environment), wherein it would be beneficial to provide synchronized navigation and content rendering between multiple pop-up windows. The example method 500 may include one or more operations, functions, or actions illustrated by one or more blocks, such as blocks 502 to 516. The various blocks of the method 500 and/or of any other process(es) described herein may be combined into fewer blocks, divided into additional blocks, supplemented with further blocks, and/or eliminated based upon the desired implementation.

According to one embodiment, the method 500 may be performed by the user interface 150, in cooperation with the other elements of the user device 146, such as the web client 148, the processor 200, the display screen 206, and other elements depicted in FIG. 2.

At a block 502 ("Generate multiple pop-up windows"), the pop-up window generator 212 launches multiple pop-up windows for display on the user interface 150. The pop-up window generator 212 may launch the multiple pop-up windows, for example, in response to the navigation detection component 216 having detected user activations of the pop-up window command button 314 in the user interface 150. The pop-up windows may render graphical representations of usage data, such as line graphs, tabular data, etc., such as shown in the examples of FIGS. 3 and 4.

At a block 504 ("Perform synchronized refresh of pop-up windows at refresh intervals"), the web client 148 may pull usage data from the local data storage device 152 and/or from the management server 142, for the user interface 150 to display in the pop-up windows, and then refresh the usage data according to a common timestamp such as that provided by the clock 208.

At a block 506 ("Detect user navigation within a first pop-up window?"), the navigation detection component 216 monitors for user navigation within a pop-up window. While no navigation is detected, then the usage data in the pop-up windows continue to be refreshed at the block 504. If navigation is detected at the block 506, then the method 500 moves to a block 508 ("Identify navigation point within a graphical representation rendered in the first pop-up window"), wherein the navigation detection component 216 identifies a user-selected navigation point in a graphical representation.

At a block 510 ("Highlight the navigation point in the graphical representation rendered in the first pop-up window"), the user interface 150 highlights the user-selected navigation point in the graphical representation rendered in the first pop-up window. For example and as depicted in FIG. 4, the highlighting may take the form of the cross-hair 406 and the information box 408 placed at a navigation point on a particular line graph, corresponding to a particular timestamp.

At a block 512 ("Synchronize at least a second pop-up window with the first pop-up window"), the content displayed in at least a second pop-up window is synchronized with the user selection/navigation made in the first pop-up window. Again referring to FIG. 4 as an example, a navigation point in a line graph in the second pop-up window 404, corresponding to substantially the same timestamp location as the navigation point in the first pop-up window 402, may be highlighted via the faded cross-hair 410 and/or the information box 412 in the second pop-up window 404. With this synchronized presentation, the system administrator can more easily and concurrently view the behavior (of the various elements in the virtualized computing environment 100) that occur at the same timeframe, for purposes of troubleshooting, etc., as opposed to piecemeal examination of usage data with relatively less timestamp correlation.

At a block 514 ("Detect further user action?"), the navigation detection component 216 continues to monitor for further user action. While no further action is detected, the synchronized refresh is performed at the block 504. If the navigation detection component 216 detects a further user action taken with the navigation tool 2020 (e.g., a change in view type from VM to host or vice versa, a zoom-in or zoom-out within a pop-up window, etc.), then the user interface 150 applies the user action to the pop-up window (such as the first pop-up window 402, if the user action was applied to content to be presented in the first pop-up window). The method then moves to the block 512 to apply a similar action to applicable other pop-up windows, so as to synchronize the pop-up windows.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIG. 2 to FIG. 5.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term "processor" is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to more efficiently view usage data.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other computer-readable instruction to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

We claim:

1. A method to synchronize pop-up windows of a user interface for a virtualized computing environment, the method comprising:
generating multiple pop-up windows on the user interface, wherein the multiple pop-up windows include a first pop-up window and at least a second pop-up window;
rendering a first graphical representation in the first pop-up window and a second graphical representation in the at least the second pop-up window, wherein the first and second graphical representations are associated with usage data that pertain to operation of elements in the virtualized computing environment;
detecting a navigation by a navigation tool to a first navigation point in the first graphical representation;
highlighting the first navigation point, wherein highlighting the first navigation point includes rendering a first movable marker, at the first navigation point, with a first appearance to indicate that the first movable marker is a primary marker that is actively controlled with the navigation tool; and
synchronizing the at least the second pop-up window with the first pop-up window by highlighting a second navigation point, in the second graphical representation, that corresponds to a same timestamp as the first navigation point,
wherein highlighting the second navigation point includes rendering a second movable marker, at the second navigation point, with a second appearance that distinguishes from the first appearance to indicate that the second movable marker is a secondary marker relative to the primary marker that is actively controlled with the navigation tool.

2. The method of claim 1, wherein highlighting the first navigation point further includes rendering an information box along with the first movable marker, at the first navigation point, to present information corresponding to the first navigation point.

3. The method of claim 1, further comprising synchronizing refresh of the first pop-up window and the at least the second pop-up window according to a common refresh interval.

4. The method of claim 1, wherein synchronizing the at least the second pop-up window with the first pop-up window includes changing a location of the highlighting in the at least the second pop-up window to track a corresponding movement of the highlighting in the first pop-up window.

5. The method of claim 1, wherein the first and second graphical representations include line graphs having values that change over time, and wherein the line graphs are associated with metrics that include one or more of: central processing unit (CPU) usage, CPU ready time, network latency, data store read/write latency, memory usage, network transmission rate, power consumption, virtual disk usage, and storage adapter read/write latency.

6. The method of claim 1, further comprising enabling navigation in the at least the second pop-up window, wherein the navigation in the at least the second pop-up window results in a corresponding navigational movement in another pop-up window generated on the user interface.

7. The method of claim 1, wherein rendering the first and second graphical representations include obtaining the usage data for the first and second graphical representations from at least one of a local storage device or a management server for the virtualized computing environment.

8. A non-transitory computer-readable medium having instructions stored thereon, which in response to execution by one or more processors, cause the one or more processors to perform or control performance of operations to synchronize pop-up windows of a user interface for a virtualized computing environment, the operations comprising:
generating multiple pop-up windows on the user interface, wherein the multiple pop-up windows include a first pop-up window and at least a second pop-up window;
rendering a first graphical representation in the first pop-up window and a second graphical representation in the at least the second pop-up window, wherein the first and second graphical representations are associated with usage data that pertain to operation of elements in the virtualized computing environment;
detecting a navigation by a navigation tool to a first navigation point in the first graphical representation;
highlighting the first navigation point, wherein highlighting the first navigation point includes rendering a first movable marker, at the first navigation point, with a first appearance to indicate that the first movable marker is a primary marker that is actively controlled with the navigation tool; and
synchronizing the at least the second pop-up window with the first pop-up window by highlighting a second navigation point, in the second graphical representation, that corresponds to a same timestamp as the first navigation point,
wherein highlighting the second navigation point includes rendering a second movable marker, at the second navigation point, with a second appearance that distinguishes from the first appearance to indicate that the second movable marker is a secondary marker relative to the primary marker that is actively controlled with the navigation tool.

9. The non-transitory computer-readable medium of claim 8, wherein highlighting the first navigation point further includes rendering an information box along with the first movable marker, at the first navigation point, to present information corresponding to the first navigation point.

10. The non-transitory computer-readable medium of claim 8, wherein the operations further comprise:
synchronizing refresh of the first pop-up window and the at least the second pop-up window according to a common refresh interval.

11. The non-transitory computer-readable medium of claim 8, wherein synchronizing the at least the second pop-up window with the first pop-up window includes changing a location of the highlighting in the at least the second pop-up window to track a corresponding movement of the highlighting in the first pop-up window.

12. The non-transitory computer-readable medium of claim 8, wherein the first and second graphical representations include line graphs having values that change over time, and wherein the line graphs are associated with metrics that include one or more of: central processing unit (CPU) usage, CPU ready time, network latency, data store read/write latency, memory usage, network transmission rate, power consumption, virtual disk usage, and storage adapter read/write latency.

13. The non-transitory computer-readable medium of claim 8, wherein the operations further comprise:
enabling navigation in the at least the second pop-up window, wherein the navigation in the at least the second pop-up window results in a corresponding navigational movement in another pop-up window generated on the user interface.

14. The non-transitory computer-readable medium of claim 8, wherein rendering the first and second graphical representations includes obtaining the usage data for the first and second graphical representations from at least one of a local storage device or a management server for the virtualized computing environment.

15. An apparatus to synchronize pop-up windows for a virtualized computing environment, the apparatus comprising:
a display screen configured to present a user interface;
a processor; and
a non-transitory computer-readable medium coupled to the processor and having instructions stored thereon, which in response to execution by the processor, cause the processor to perform or control performance of operations to synchronize pop-up windows of the user interface, wherein the operations comprise:
generating multiple pop-up windows on the user interface, wherein the multiple pop-up windows include a first pop-up window and at least a second pop-up window,
wherein the user interface is configured to render a first graphical representation in the first pop-up window and a second graphical representation in the at least the second pop-up window, and wherein the first and second graphical representations are associated with usage data that pertain to operation of elements in the virtualized computing environment;
detecting a navigation by a navigation tool to a first navigation point in the first graphical representation, wherein the user interface is further configured to highlight the first navigation point, and wherein to highlight the first navigation point, the user interface is configured to render a first movable marker, at the first navigation point, with a first appearance to indicate that the first movable marker is a primary marker that is actively controlled with the navigation tool; and
synchronizing the at least the second pop-up window with the first pop-up window by causing the user interface to highlight a second navigation point, in the second graphical representation, that corresponds to a same timestamp as the first navigation point,
wherein to highlight the second navigation point, the user interface is configured to render a second movable marker, at the second navigation point, with a second appearance that distinguishes from the first appearance to indicate that the second movable marker is a secondary marker relative to the primary marker that is actively controlled with the navigation tool.

16. The apparatus of claim 15, wherein to highlight the first navigation point, the user interface is further configured to render an information box along with the first movable marker, at the first navigation point, to present information corresponding to the first navigation point.

17. The apparatus of claim 15, wherein the operations further comprise:
synchronizing refresh of the first pop-up window and the at least the second pop-up window according to a common refresh interval.

18. The apparatus of claim 15, wherein synchronizing the at least the second pop-up window with the first pop-up window includes changing a location of the highlighting in the at least the second pop-up window to track a corresponding movement of the highlighting in the first pop-up window.

19. The apparatus of claim 15, wherein the first and second graphical representations include line graphs having values that change over time, and wherein the line graphs are associated with metrics that include one or more of: central processing unit (CPU) usage, CPU ready time, network latency, data store read/write latency, memory usage, network transmission rate, power consumption, virtual disk usage, and storage adapter read/write latency.

20. The apparatus of claim 15, wherein the user interface is further configured to enable navigation in the at least the second pop-up window, wherein the navigation in the at least the second pop-up window results in a corresponding navigational movement in another pop-up window generated on the user interface.

21. The apparatus of claim 15, further comprising a web client, wherein for the user interface to render the first and second graphical representations, the web client is configured to obtain the usage data for the first and second graphical representations from at least one of a local storage device or a management server for the virtualized computing environment.

* * * * *